United States Patent [19]
Ho

[11] Patent Number: 5,644,517
[45] Date of Patent: Jul. 1, 1997

[54] METHOD FOR PERFORMING MATRIX TRANSPOSITION ON A MESH MULTIPROCESSOR ARCHITECTURE HAVING MULTIPLE PROCESSOR WITH CONCURRENT EXECUTION OF THE MULTIPLE PROCESSORS

[75] Inventor: Ching-Tien Ho, San Jose, Calif.

[73] Assignee: International Business Machines Corporation, Armonk, N.Y.

[21] Appl. No.: 496,036

[22] Filed: Jun. 28, 1995

Related U.S. Application Data

[63] Continuation of Ser. No. 965,498, Oct. 22, 1992, abandoned.

[51] Int. Cl.$^6$ .......................... G06F 15/173; G06F 17/16
[52] U.S. Cl. ...................... 364/725.02; 395/311; 395/800
[58] Field of Search .................................. 364/725, 741; 395/311

[56] References Cited

U.S. PATENT DOCUMENTS

| | | | |
|---|---|---|---|
| 4,769,790 | 9/1988 | Yamashita | 365/189 |
| 4,787,057 | 11/1988 | Hammond | 364/754 |
| 4,914,615 | 4/1990 | Karmarkar et al. | 364/754 |
| 4,918,527 | 4/1990 | Penard et al. | 358/160 |
| 5,101,371 | 3/1992 | Iobst | 364/736 |

FOREIGN PATENT DOCUMENTS 54-87423  7/1979  Japan .

OTHER PUBLICATIONS

N. G. Azari, A. W. Bojanczyk and S. Y. Lee, "Synchronous and Asynchronous Algorithms for Matrix Transposition on MCAP," SPIE vol. 975, Advanced Algorithms & Architectures for Signal Processing III, pp. 277–288., 1988.
J. O. Eklundh, "A Fast Computer Method for Matrix Transposing," IEEE Transactions on Computers, pp. 801–803, Jul. 1972.
H. S. Stone, "Parallel Processing with the Perfect Shuffle," IEEE Transactions on Computers, vol. C–20, No. 2, pp. 153–161, Feb. 1971.
S. L. Johnsson, "Communication Efficient Basic Linear Algebra Computations on Hypercube Architectures," Journal of Parallel and Distributed Computing 4, pp. 133–172, 1987.
O. A. McBryan and E. F. Van De Velde, "Hypercube Algorithms and Implementations," SIAM J. Sci. Stat. Comput., vol. 8, No. 2, pp. s227–287, Mar. 1987.
Q. F. Stout and B. Wagar, "Passing Messages in Link–Bound Hypercubes," In Hypercube Multiprocessors, SIAM, 1991.
C. T. Ho and M. T. Raghunath, "Efficient Communication Primitives on Circuit–Switched Hypercubes," IEEE, 0–8186–2290–3/91/0000/0390, pp. 390–397, 1991.
D. Nassimi and S. Sahni, "An Optimal Routing Algorithm for Mesh–Connected Parallel Computers," Journal of the Association for Computing Machinery, vol. 27, No. 1, pp. 6–29, Jan. 1980.
S. L. Johnsson and C. T. Ho, "Algorithms for Matrix Transposition on Boolean N–Cube Configured Ensemble Architectures," SIAM J. Matrix Anal. Appl., vol. 9, No. 3, pp. 419–454, Jul. 1988.
H. Nakano, T. Tsuda, "Optimizing Inter-processor Data Transfers in Transpositions of Matrices Stored Row–wise on Mesh–connected Parallel Computers," Trans. Inf. Process. Soc. Jpn. (Japan), vol. 27, No. 3, pp. 348–355, 1986. (Article Published in Japan).

*Primary Examiner*—Thomas G. Black
*Assistant Examiner*—Jack M. Choules
*Attorney, Agent, or Firm*—James C. Pintner; Philip E. Blair

[57] ABSTRACT

A matrix transpose method for transposing any size matrix on a 2-dimensional mesh multi-node system with circuit-switched-like routing in the iterative and recursive forms. The matrix transpose method involves a two-level decomposition technique of first partitioning each mesh on a diagonal axis into four submeshes and then further partitioning each of the four submeshes on the diagonal axis into four submeshes. The transposition of all off-diagonal submatrices can be performed concurrently and the transposition of all successive on-diagonal submatrices can be performed iteratively or recursively.

8 Claims, 7 Drawing Sheets j →
column

|  |  |  |  |
|---|---|---|---|
| M(0,0) (0,0) | M(0,1) (0,1) | M(0,2) (0,2) | M(0,3) (0,3) |
| M(1,0) (1,0) | M(1,1) (1,1) | M(1,2) (1,2) | M(1,3) (1,3) |
| M(2,0) (2,0) | M(2,1) (2,1) | M(2,2) (2,2) | M(2,3) (2,3) |
| M(3,0) (3,0) | M(3,1) (3,1) | M(3,2) (3,2) | M(3,3) (3,3) | i ↓ row

PRIOR ART

FIG. 1A column

|  |  |  |  |
|---|---|---|---|
| M(0,0) (0,0) | M(1,0) (0,1) | M(2,0) (0,2) | M(3,0) (0,3) |
| M(0,1) (1,0) | M(1,1) (1,1) | M(2,1) (1,2) | M(3,1) (1,3) |
| M(0,2) (2,0) | M(1,2) (2,1) | M(2,2) (2,2) | M(3,2) (2,3) |
| M(0,3) (3,0) | M(1,3) (3,1) | M(2,3) (3,2) | M(3,3) (3,3) | row

PRIOR ART

| P(0,0) | P(0,1) | P(0,2) | P(0,3) | P(0,4) | P(0,5) | P(0,6) | P(0,7) |
| --- | --- | --- | --- | --- | --- | --- | --- |
| P(1,0) | P(1,1) | P(1,2) | P(1,3) | P(1,4) | P(1,5) | P(1,6) | P(1,7) |
| P(2,0) | P(2,1) | P(2,2) | P(2,3) | P(2,4) | P(2,5) | P(2,6) | P(2,7) |
| P(3,0) | P(3,1) | P(3,2) | P(3,3) | P(3,4) | P(3,5) | P(3,6) | P(3,7) |
| P(4,0) | P(4,1) | P(4,2) | P(4,3) | P(4,4) | P(4,5) | P(4,6) | P(4,7) |
| P(5,0) | P(5,1) | P(5,2) | P(5,3) | P(5,4) | P(5,5) | P(5,6) | P(5,7) |
| P(6,0) | P(6,1) | P(6,2) | P(6,3) | P(6,4) | P(6,5) | P(6,6) | P(6,7) |
| P(7,0) | P(7,1) | P(7,2) | P(7,3) | P(7,4) | P(7,5) | P(7,6) | P(7,7) |

PRIOR ART

FIG. 6

METHOD FOR PERFORMING MATRIX TRANSPOSITION ON A MESH MULTIPROCESSOR ARCHITECTURE HAVING MULTIPLE PROCESSOR WITH CONCURRENT EXECUTION OF THE MULTIPLE PROCESSORS

This is a continuation of application Ser. No. 07/965,498 filed on Oct. 22, 1992, now abandoned.

FIELD OF THE INVENTION

Broadly conceived, the present invention relates to methods for matrix transpose on multi-processor computer systems. More particularly, the present invention relates to a matrix transpose method for a 2-dimensional mesh configured multi-node parallel computer network with circuit-switched-like routing.

BACKGROUND HISTORY

Manipulation of systems of arrays of numbers has resulted in the development of various matrix operations. One such matrix operation is called the transpose which has a representation as $M^T$, where M defines the matrix and T defines the transpose operation. Matrix transpose is a permutation frequently performed in linear algebra and particularly useful in finding the solution set for complex systems of differential equations. A particular example where matrix transposition may be advantageous to finding the correct solution set is in Poisson's problem by the Fourier Analysis Cyclic Reduction (FACR) method.

A matrix transpose operation involves defining a diagonal from the upper left corner of the matrix to the lower right corner. Then, swapping all the elements on the lower left half of the matrix diagonal with the corresponding elements on the upper right half of the diagonal. All the elements included in the diagonal get swapped with themselves or, in other words, remain the same. The end result of the matrix transpose is to obtain a matrix that has been essentially folded along its diagonal axis with the elements having been transposed across the diagonal line.

The matrix transpose has implications particularly important to finding the solution set to complex systems of equations. One drawback to the matrix transpose technique is that performing the transpose operation on large matrices is time consuming and prone to error and miscalculation. For this reason, the computer environment is particularly well suited to perform matrix transpose operations because the computer is fast and accurate.

Multiprocessor computer systems having parallel architectures employ a plurality of processors that operate in parallel to simultaneously perform a single set of operations. On parallel multiprocessor systems, a problem is broken up into several smaller sub-problems then distributed to the individual processors which operate on separate segments of the sub-problems allocated to them. When all the processors have completed their simultaneous operations, the individual parts of the solved sub-problems are then re-assembled to produce the final solution. With such a parallel architecture, complex problems can be manipulated in such a fashion as to produce a solution in a much quicker time than it would take for a single processor to perform the same problem alone.

One such parallel multiprocessor computer architecture is called the mesh. Another is the hypercube. A parallel computer's mesh architecture is configured as an array of processors or nodes much like a mesh or grid.

After a complex problem has been broken into smaller sub-problems, the pieces must be distributed among the processors for parallel computation. Routing is the way a processor chooses a path in the mesh when it communicates with other processors on the mesh by sending them messages and deals with the way messages are carried through the network.

Various routings are known in the art and associated with mesh architecture such as store-and-forward, circuit-switched, wormhole, and virtual cut-through routing. Store-and-forward is often considered the least complex of the routing methods. While there are differences between circuit-switched, wormhole, and virtual cut-through routings, they all can be modeled by the same complexity estimates when there is no congestion on the mesh so that these routings are considered to be roughly equally more advanced than the store-and-forward method and can be considered to be circuit-switched-like.

For most current parallel architectures with circuit-switched-like routing, each node in a single step can send out at most one message originated from it, receive at most one message destined for it, and allow any number of by-passing messages through it so long as there is no congestion. Such communication capability is often referred to as the one-port communication model. In an all-port communication model, each processor can communicate with all other processors simultaneously in a single step.

For choosing the particular path in routing on a two-dimensional, there is typically the XY-routing or YX-routing. In the XY-routing on a two-dimensional mesh, a message travels horizontally then vertically towards its destination node. While in the YX-routing, a message travels vertically then horizontally towards its destination node.

The following complexities render the matrix transpose on a mesh a complicated problem: the limited communication bandwidth for the mesh topology (typically used XY- or YX-routing); and the availability of more advanced circuit-switched-like routing.

The following references are considered to be pertinent to understanding the background of the invention.

Eklundh, "A Fast Computer Method for Matrix Transposing", IEEE Trans. Comput., 21(7):801–803, 1972, wherein the recursive exchange algorithm for the matrix transpose problem is discussed.

Stone, "Parallel Processing with the Perfect Shuffle", IEEE Trans. Comput., 20:153–161, 1971, wherein matrix transpose on shuffle-exchange networks is discussed.

Johnsson, "Communication Efficient Basic Linear Algebra Computations on Hypercube Architectures", J. Parallel Distributed Computing, 4(2):133–172, April 1987, and McBryan and Van de Velde, "Hypercube Algorithms and Implementations", SIAM J. Sci. Stat. Comput., 8(2):s227–s287, March 1987, wherein the recursive exchange algorithm is applied to hypercube architectures. Johnsson also gives a transpose algorithm for a torus, i.e., a mesh with wraparound edges, computer with multiple matrix elements per processor. The communication model assumed was all-port and the routing was store-and-forward.

Johnsson and Ho, "Matrix Transposition on Boolean N-Cube Configured Ensemble Architectures", SIAM J. Matrix Anal. Appl., 9(3):419–454, July 1988, and independently, Stout and Wagar, "Passing Messages in Link-Bound Hypercubes", Hypercube Multiprocessors, Society for Industrial and Applied Mathematics, 1987, discussed matrix transpose algorithms on hypercube architectures for the all-port communication model.

Ho and Raghunath, "Efficient Communication Primitives on Circuit-Switched Hypercubes", IEEE Sixth Distributed Memory Computing Conference, pp. 330–397, April 1991, wherein a transpose algorithm for circuit-switched routing on hypercubes with the one-port communication model was discussed.

Nassimi and Sahni, "An Optimal Routing Algorithm for Mesh-Connected Parallel Computers", Journal of ACM, Vol. 27, No. 1, pp. 6–29, January 1980, wherein a transpose algorithm for a mesh computer with store-and-forward routing and one matrix element per processor was given.

Although the recursive exchange algorithm to perform the matrix transpose on the hypercube architecture has been applied to mesh configurations having the store-and-forward routing (such as the prior art by Nassimi and Sahni and that by Johnsson), what is absent in the art has been to provide a matrix transpose algorithm for the 2-dimensional mesh multiprocessor configuration with circuit-switched-like routing.

SUMMARY OF THE INVENTION

The present invention relates to a matrix transpose system and method for use on a 2-dimensional N×N mesh multiprocessor parallel network with circuit-switched-like routing in the recursive and iterative forms.

It is a primary object of the present invention to provide a method for matrix transpose on mesh multi-node parallel computer networks that provides a two-level decomposition technique of a matrix wherein the transposition of all off-diagonal submatrices can be performed concurrently, and wherein the transposition of all successive on-diagonal submatrices can be performed iteratively or recursively.

It is another object to provide a matrix transpose method that is commercially feasible to implement on mesh connected multi-processor architectures for large scale numerical computation applications involving the matrix transpose operation.

It is another object to provide a matrix transpose method that takes advantage of meshes with circuit-switched-like routing.

Briefly summarized and to achieve the foregoing objects in accordance with the present invention as embodied and broadly described herein, a method for transposing any size matrix on a 2-dimensional mesh multi-node system with circuit-switched-like routing in the iterative and recursive form is disclosed. Each node of the multi-node mesh has a datablock representing a sub-matrix allocated to it for transposition. The recursive matrix transpose method disclosed herein has the first step of partitioning each mesh on a diagonal axis into four submeshes. The two-level decomposition involves further partitioning each of the four submeshes on the diagonal axis into four submeshes. Then, concurrently performing a transposition of all datablocks on all processors included in all submeshes off the diagonal axis and repeating these steps if there exists a submesh of a size >(1×1) on the diagonal axis which does not contain any partitioned submeshes.

The iterative technique of the present method for transposing a matrix having a diagonal axis on a 2-dimensional N×N mesh, where N is a power of 2 and wherein each processor has a datablock allocated thereto, has the first step of determining $k=\lceil \log_4 N \rceil$. Then, executing in parallel for an index i, wherein i=0 to k−1 the following steps of: partitioning each $$\frac{N}{2^{2i}} \times \frac{N}{2^{2i}}$$

mesh on a diagonal axis into four $$\frac{N}{2^{2i+1}} \times \frac{N}{2^{2i+1}}$$

submeshes; partitioning further each $$\frac{N}{2^{2i+1}} \times \frac{N}{2^{2i+1}}$$

submesh, wherein $$\frac{N}{2^{2i+1}} > 1,$$

on the diagonal axis into four $$\frac{N}{2^{2i+2}} \times \frac{N}{2^{2i+2}}$$

submeshes; and concurrently performing a transportation of all datablocks on all processors included on all submeshes off the diagonal axis.

Additional objects and advantages of the invention will be set forth in the description which follows, and in part will be obvious to those of ordinary skill in this art from the following detailed specification or may be learned by the practice of this invention. These and other objects and advantages may be realized and obtained by the appended claims in conjunction with the accompanying drawings and detailed specification.

BRIEF DESCRIPTION OF THE DRAWINGS

In order that the manner in which the above-recited and other advantages and objects of the invention are obtained, a more particular description of the invention briefly described above will be rendered by reference to a specific embodiment thereof which is illustrated in the appended drawings. Understanding that these drawings depict only a typical embodiment of the invention and are not therefore to be considered limiting of its scope, the invention will be described and explained with additional specificity and detail through the use of the accompanying drawings in which.

DETAILED DESCRIPTION OF THE PREFERRED EMBODIMENT

The present invention is directed to an efficient matrix transpose method for use on a 2dimensional N×N mesh configured multi-processor parallel network with circuit-switched-like routing wherein each processor of the multi-processor configuration has a datablock on it representing a sub-matrix allocated to it for transposition and wherein the transposition of all successive on-diagonal submatrices can be performed iteratively or recursively by repeating the same decomposition procedure concurrently for all on-diagonal submatrices. As such, some basic assumptions lay the foundation for the following discussion. Throughout, we assume a 2-dimensional mesh of the form N×N, where $N=2^n$. Note that the assumption that N is a power of 2 is only made to facilitate the description of the present invention and is not necessarily required for the disclosed matrix transpose method.

An $N_1 \times N_2$ matrix has $N_1$ rows and $N_2$ columns of elements. The rows are the components of the elements of the matrix designated by the index i and the columns are the components of each element of the matrix designated by the index j. Therefore, each matrix element would have a unique index of (i, j), where i is the index into row $N_1$ and j is the index into column $N_2$. The row index starts from 0 for the top row to $N_1-1$ for the bottom row. The column index starts from 0 for the leftmost column to $N_2-1$ for the rightmost column.

Figure 1A:
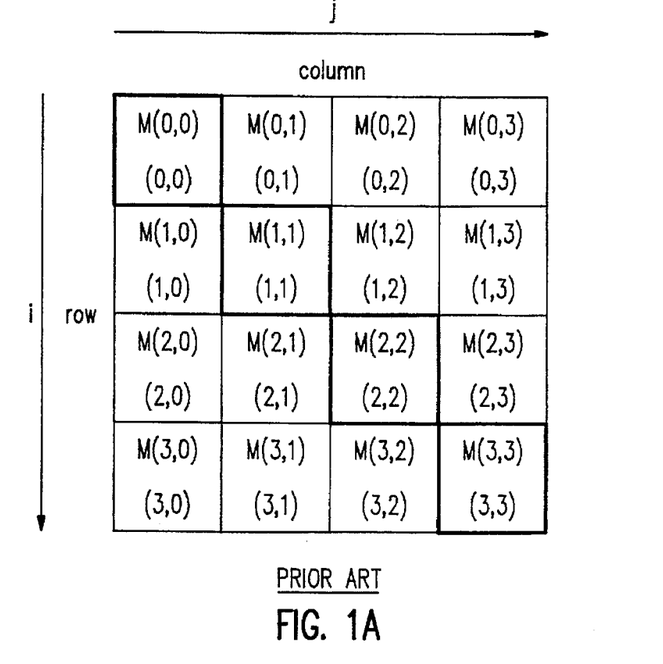
FIG. 1A is an illustration of the prior art showing a 4×4 matrix, wherein the notation (i, j) in the lower part of each box represents the location of a matrix element while the notation M(i, j) in the upper part of each box represents the data value of a matrix element.

With reference to FIG. 1A of the prior art, a 4×4 matrix, where $N_1=4$ and $N_2=4$, has 4 rows and 4 columns. The notation (i, j) in the lower part of each box is used herein to represent the location of a matrix element and the notation M(i, j) in the upper part of each box is used herein to represent the data value of a matrix element. At each row and column index a matrix datablock is contained thereon. A line from the upper left corner to the lower right corner of the matrix defines the matrix diagonal which separates the lower left matrix from the upper right matrix and essentially divides the matrix in half. It should be understood that all elements included in the diagonal do not belong to either the lower left or upper right halves.

Figure 1B:
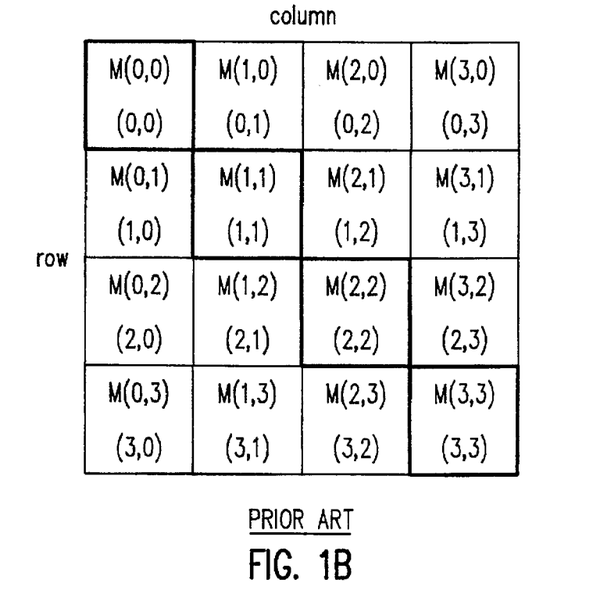
FIG. 1B is an illustration of the prior art of the 4×4 matrix of FIG. 1A having the same notation thereon further showing the locations of the datablocks after the transpose operation.

With reference now to prior art FIG. 1B, which is an illustration of the 4×4 matrix of FIG. 1A, having the same notation thereon, shows the relative positions of the transposed matrix datablocks. All the datablocks of (i, j) would be swapped with corresponding datablocks of (j, i). For example, the datablock M(3,2) on row 3 column 2, i.e., having location index (3,2), is shown swapped with datablock M(2,3) on row 2 column 3. Further, all the datablocks included in the diagonal axis, which would be where i=j, such as datablocks M(0,0), M(1,1), M(2,2), and M(3,3), would remain the same.

Figure 2A:
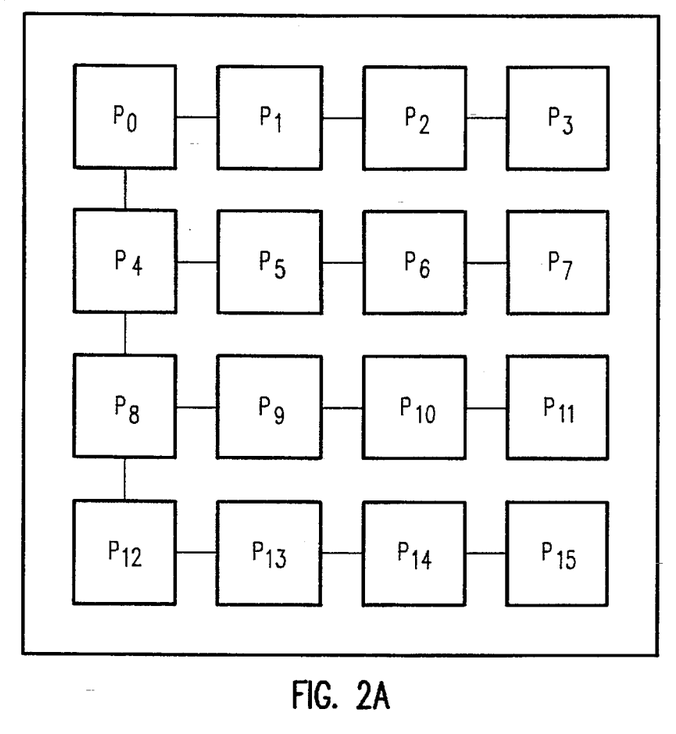
FIG. 2A is a schematic illustration of a 4×4 mesh configuration representing either a computer, rack, circuit-board, single chip, multi-processor system wherein the individual processors of the mesh are inter-linked such that each processor communicates with other processors.
Figure 2B:
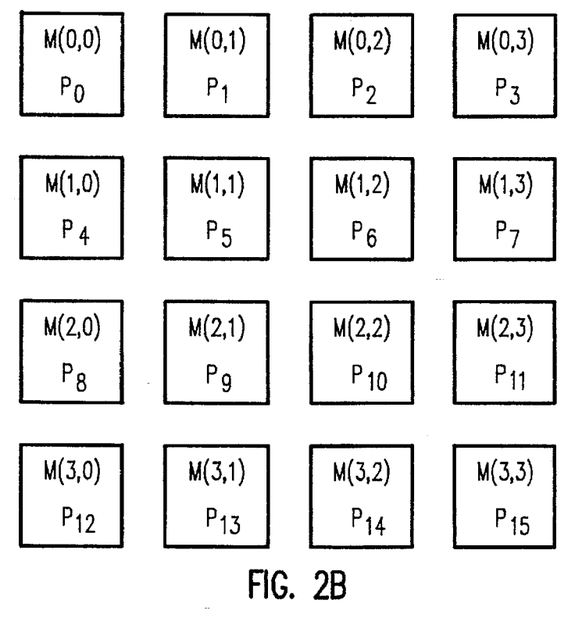
FIG. 2B is a schematic illustration of the mesh configuration of FIG. 2A, wherein each mesh processor has been allocated a corresponding matrix element or submatrix block.

The mesh topology is one of the most important architectures in parallel computer systems. FIG. 2A is a schematic illustration of a 4×4 mesh topological configuration representing either a processor, computer, rack, circuit-board, single chip, or any multi-node system or network wherein the individual nodes of the mesh are inter-linked such that each node communicates with adjacent nodes. All the nodes of the multi-node 2-dimensional system of FIG. 2A form a mesh that has the configuration of a matrix. As shown in FIG. 2B, when the individual processors, designated $P_0$–$P_{15}$ of FIG. 2A, have been assigned a (row, column) index, the matrix configuration of the mesh topology becomes more evident. Note that an (i, j) index not only identifies the mesh processor at row i and column j, but also identifies the submatrix allocated to this mesh processor as the partitioned submatrix at i-th block row and at the j-th block column. Thus, the size of the global matrix can in general be larger than the size of the mesh. It should be understood and appreciated that each mesh has a submatrix of size up to $\lceil N_1/N \rceil \times \lceil N_2/N \rceil$. For clarity, in this and subsequent figures, P(i, j) to denotes the mesh processor at location row i and column j, and use M(i, j) to denote the data of the submatrix block allocated to P(i, j) initially.

Figure 3:
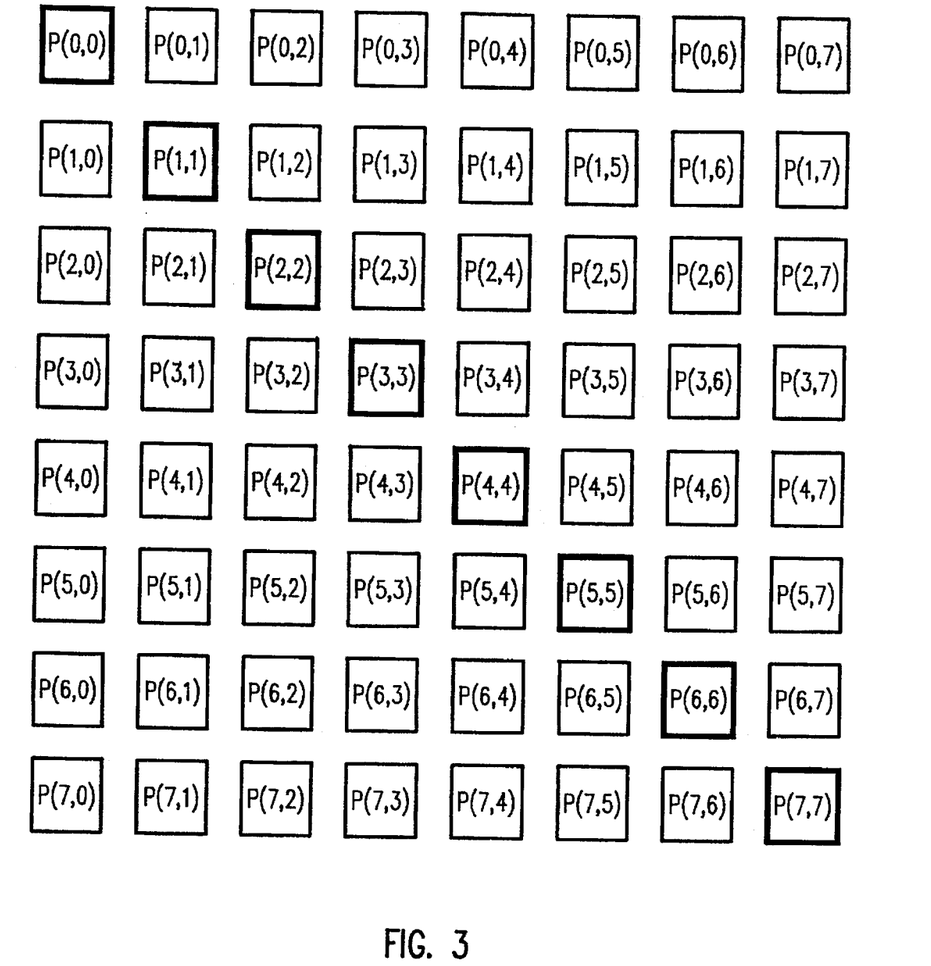
FIG. 3 is a schematic illustration of the mesh configuration of FIG. 2B, wherein the mesh has been expanded to have 8 rows and 8 columns and the diagonal elements are hi-lited with a bold border and wherein each processor on the mesh having an address (i, j) is denoted by P(i, j) so as to be consistent with the submatrix block allocated thereto.

Reference is now made to FIG. 3, which is a schematic illustration of the mesh configuration of FIG. 2B, wherein the mesh has been expanded to 8×8, i.e., N=8. The purpose of the expansion of the mesh of FIG. 2B, as shown in FIG. 3, is to allow for a slightly larger mesh in order to facilitate an understanding of the preferred embodiment of the present invention. Each processor on the mesh has an address (i, j), denoted by P(i, j), so as to be consistent with the submatrix block allocated thereto. In the upper left-hand corner of the mesh is processor node P(0,0) and at the lower right-hand corner of the mesh is processor node P(7,7). All other nodes on the mesh have a similar corresponding P(i, j) index for P(row index, column index). The diagonal elements, wherein i=j, are hi-lited in bold.

Further, we assume a mesh with circuit-switched-like, XY-routing and with the one-port communication model. A one-port communication model is a configuration with the characteristics that each node on the mesh can only send to one other node and simultaneously receive from one other node in a single step. For circuit-switched-like routing with the one-port communication model, it is generally assumed that each node in one step can send out at most one message originated from that node, receive at most one message destined for that node, and allow any number of by-passing messages so long as there is no congestion on the edges of the mesh. For the all-port communication model, each node on the mesh can send to and receive from any other nodes in a single step as long as there is no congestion on the edges. The present invention is discussed in the context of the one-port communication model although it should be understood that it is clearly applicable to the all-port communication model. This assumption of the one-port communication model will be used in the discussion herein on how the present method takes advantage of meshes with circuit-switched-like routing.

In one of two forms of the preferred embodiment, the matrix transpose recursive method of the present invention for transposing any size matrix on a 2-dimensional mesh multi-node system with circuit-switched-like routing is now discussed wherein each node of the multi-node mesh has a datablock which represents a sub-matrix allocated to it for transposition.

The recursive matrix transpose method has the first step of partitioning each mesh on a diagonal axis into four submeshes. The four resulting submeshes each are of size $\leq (\lceil N/2 \rceil \times \lceil N/2 \rceil)$. The second step is to further partition each of the four submeshes on the diagonal axis of size $N'\times N'$, where $N'>1$, into four submeshes each of size $>(\lceil N'/2 \rceil \times \lceil N'/2 \rceil)$. The first two steps complete the two-level decomposition of the mesh for this iteration.

Then, the method has the third step of concurrently performing a transposition of all datablocks on all processors included in all submeshes off the diagonal axis and repeating the above three steps if there exists a submesh of a size $>(1\times 1)$ on the diagonal axis which does not contain any partitioned submeshes.

Figure 4A:
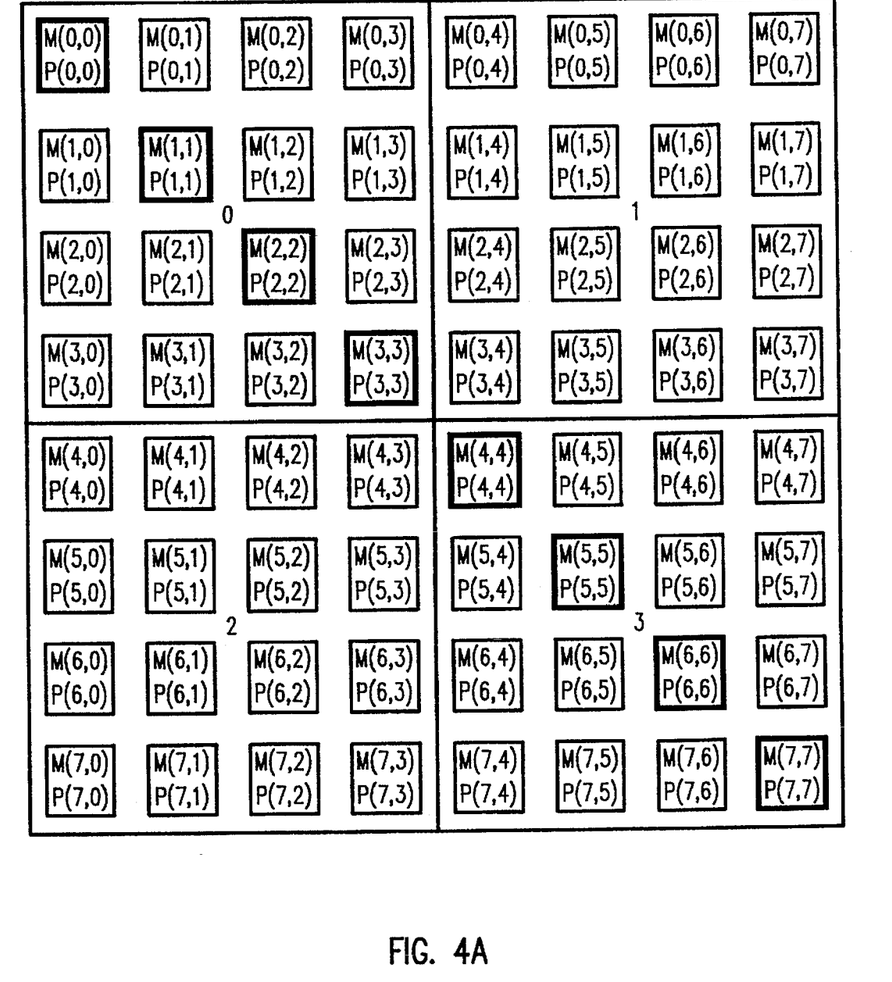
FIG. 4A is a schematic illustration of the mesh of FIG. 3, wherein the mesh is partitioned into 4 submeshes of equal size, labeled as {0,1,2,3}, and wherein the M(i, j) designates the matrix datablock allocated to processor P(i, j)
Figure 4B:
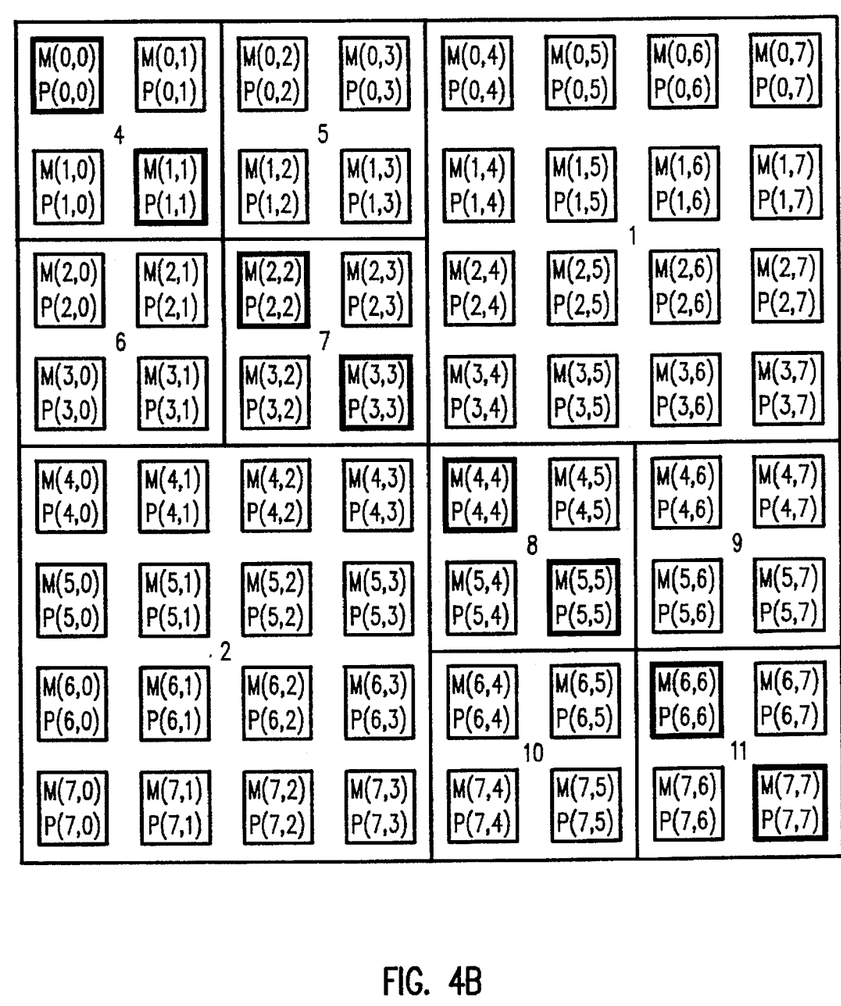
FIG. 4B is a schematic illustration of the mesh of FIG. 4A similarly configured, wherein the submeshes 0 and 3 are further partitioned into 4 equal sized submeshes {4,5,6,7} and {8,9,10,11} respectively.

By way of example and with reference being made now to FIG. 3, the recursive method involves initially defining a diagonal axis across the mesh of FIG. 3, which are all processor nodes wherein index $i=j$. This diagonal is from the upper left-hand corner of the mesh to the lower right-hand corner of the mesh. Reference is now being made to FIG. 4A which is a schematic illustration of the mesh of FIG. 3. The mesh is partitioned into 4 submeshes of equal size, labeled as $\{0,1,2,3\}$. The $M(i, j)$ designates the matrix datablock allocated to processor $P(i, j)$. The next step involves partitioning all meshes (initially there is only one such mesh) included in the diagonal axis into up to four relatively equal sized submeshes each. As shown in FIG. 4A, the mesh has been partitioned into equal sized submeshes labeled 0–3, with the diagonal axis of submesh 0 including processors $P(0,0)$, $P(1,1)$, $P(2,2)$, and $P(3,3)$, while the processors included in the diagonal of submesh 3 are $P(4,4)$, $P(5,5)$, $P(6,6)$, and $P(7,7)$. The next step is to further partition all the submeshes included in the diagonal axis into up to four relatively equal sized submeshes each. This involves submeshes 0 and 3 which are only those submeshes still remaining in the diagonal. The result of the further partitioning of the two submeshes of FIG. 4A are illustrated in FIG. 4B, which is a schematic illustration of the mesh wherein the submeshes 0 and 3 are further partitioned into 4 equal sized submeshes $\{4,5,6,7\}$ and $\{8,9,10,11\}$ respectively.

Figure 4C:
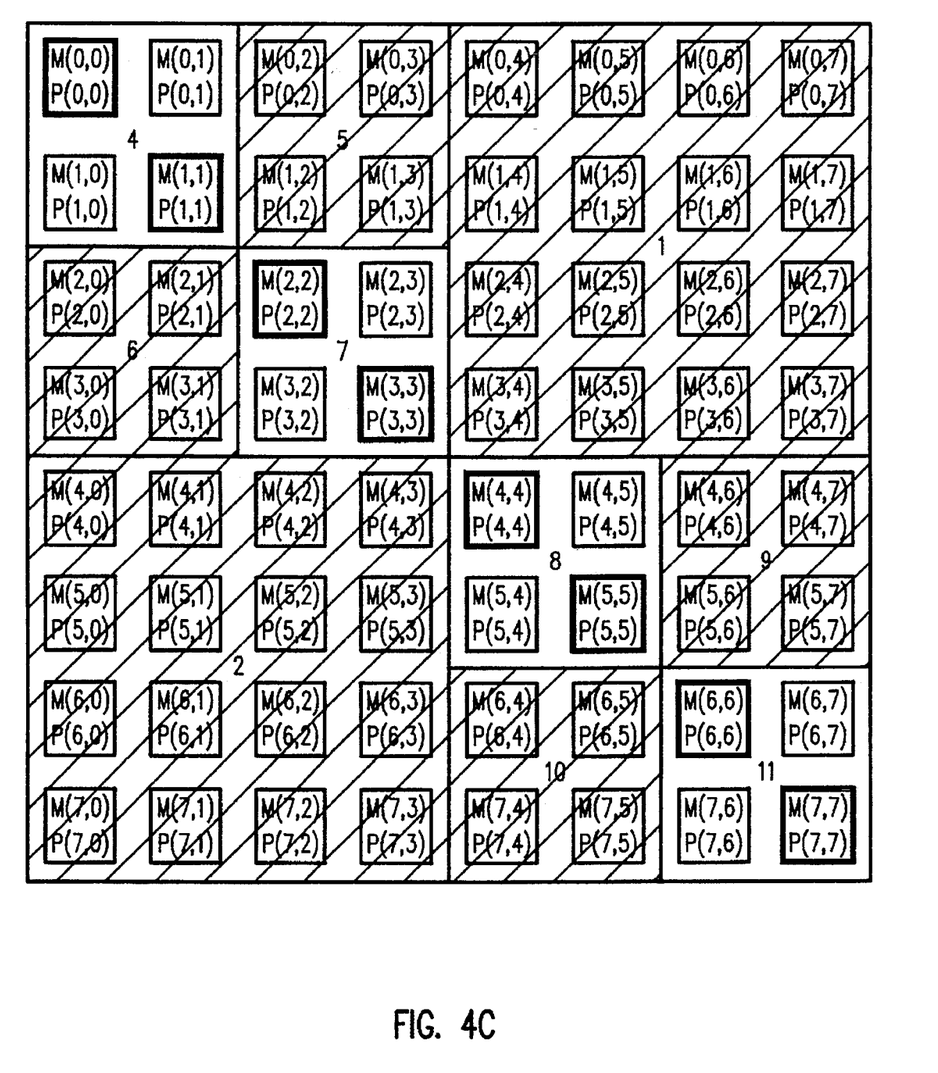
FIG. 4C is a schematic illustration of the mesh of FIG. 4B, wherein the shaded areas denote those submeshes that do not require further partitioning but are ready to begin concurrent transposition of their respective elements.

As shown in FIG. 4C, the partitioning along the diagonal is complete. The shaded areas denote those submeshes that do not require further partitioning but are ready to begin concurrent transposition of their respective matrix elements. The shaded areas of FIG. 4C, encompassing submeshes 6,5 of submesh 0, submeshes 1 and 2, and submeshes 9, 10 of submesh 3, denote those processors which are off-diagonal and therefore are ready for the step of concurrently performing a transposition of all datablocks on all nodes included in all submeshes off the diagonal axis. This involves submesh 2 transposing its datablocks with those processors in submesh 1 wherein all elements of the submatrix in processor $P(i, j)$ are swapped with all elements of the submatrix in processor $P(j, i)$.

It should be understood and appreciated that the present method can take advantage of meshes with circuit-switched-like routing in transposing all datablocks on all processors included-in all submeshes which are off the diagonal axis. Reference is now made to FIG. 4C. In the step of transposing all datablocks in all off-diagonal submeshes, such as the shaded area in FIG. 4C, YX-routing is used for submeshes 5 and 10, and XY-routing is used for all other shaded submeshes (i.e., 1, 2, 6 and 9). Note that a YX-routing can be easily simulated by a mesh with the XY-routing in two steps. With pipelining applied to sending m elements using YX-routing on a mesh, it can be realized in m+1 steps, as compared to m steps needed to send m elements using XY-routing on a mesh.

We now show that the present method takes advantage of meshes with circuit-switched-like routing. The set of edges (paths) used by submeshes 2, 6 and 10 (in transposing their matrix elements) are either east-bound or north-bound, while the set of edges used by submeshes 1, 5 and 9 are either west-bound or south-bound. Thus, the two aforementioned sets of edges are clearly disjoint. We will now focus on the edges used by submeshes 2, 6 and 10 (in transposing their matrix elements) and show that the three sets of edges used by submeshes 2, 6 and 10, respectively, are mutually disjoint. First, we note that the edges used by submesh 6 are disjoint from those used by submeshes 2 and 10. This is because the edges used by submesh 6 are all in the northwest quarter of the entire mesh, while the edges used by submeshes 2 and 10 are all in the other three quarters. Second, we note that the edges used by submesh 10 are disjoint from those used by submesh 2. This is because of two facts: (1) submesh 2 uses only horizontal edges below the diagonal axis (due to the XY-routing) while submesh 10 uses only vertical edges below the diagonal axis (due to the YX-routing), and (2) submesh 2 uses only vertical edges above the diagonal axis while submesh 10 uses only horizontal edges above the diagonal axis. We now give a few examples of the paths used by processors in submeshes 6, 2 and 10, respectively, in FIG. 4C. For example, the path used by processor $P(3,1)$, which is in submesh 6, travels through processors $P(3,2)$, $P(3,3)$ and $P(2,3)$ and arrives at processor $P(1,3)$. The path used processor $P(6,2)$, which is in submesh 2, travels through processors $P(6,3)$, $P(6,4)$, $P(6,5)$, $P(6,6)$, $P(5,6)$, $P(4,6)$ and $P(3,6)$ and arrives at processor $P(2,6)$. The path used by processor $P(6,4)$, which is in submesh 10, travels through processors $P(5,4)$, $P(4,4)$ and $P(4,5)$ and arrives at processor $P(4,6)$.

Likewise, the three sets of edges used by submeshes 1, 5 and 9, respectively, are similarly disjoint. It should be understood and appreciated that by applying the two-level decomposition technique of the present matrix transpose method to a mesh with circuit-switched-like routing using XY-routing and YX-routing for respective submeshes, the congestion across the mesh is effectively eliminated and therefore performance is improved.

Figure 5:
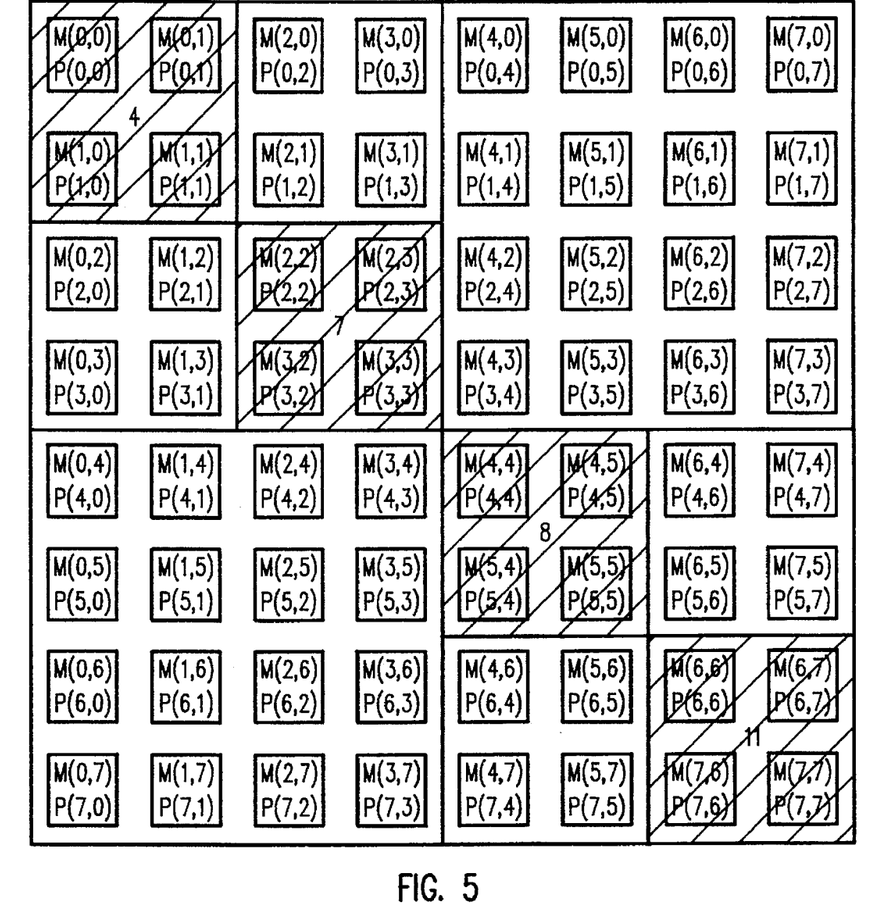
FIG. 5 is a schematic illustration of the mesh of FIG. 4C, showing the result of the transposition of all submeshes off the diagonal axis and the shaded areas hi-lite those submeshes that still require partitioning and transposition on the next iteration.
Figure 6:
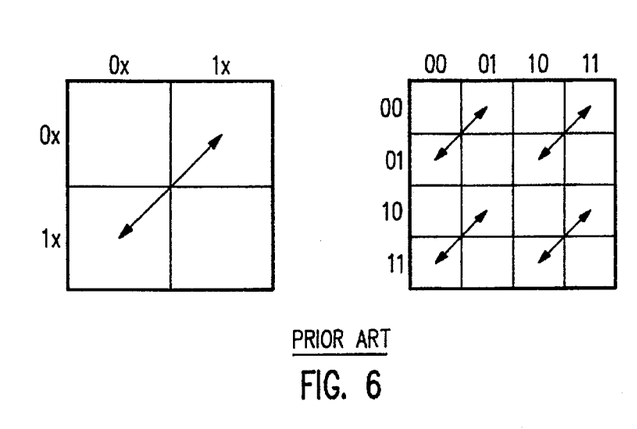
FIG. 6 is an illustration of the matrix transpose of the prior art recursive exchange algorithm indicating the direction of the transpose of the datablocks on a 4×4 matrix.

FIG. 5 shows the result of the transposition of all submeshes off the diagonal axis. Note that the datablocks of submatrices denoted $M(i, j)$ of all the off-diagonal submeshes, i.e., the unshaded areas, have been transposed. The shaded areas hi-lite those submeshes that still require partitioning and transposition on the next iteration. Lastly, the recursive matrix transpose method has the step of repeating the steps for all submeshes of size greater than $(1\times 1)$ which still remain on the diagonal axis.

In the second of two forms of the preferred embodiment, the matrix transpose iterative method of the present invention for transposing any size matrix on a 2-dimensional mesh multi-node system with circuit-switched-like routing is now discussed wherein each node of the multi-node mesh has a datablock represents a sub-matrix allocated to it for transposition.

In the preferred embodiment of the present invention, the iterative matrix transpose method on a 2-dimensional N×N mesh, where N is a power of 2 and wherein each processor has a datablock allocated thereto, has the first step of determining $k = \lceil \log_4 N \rceil$. Then, executing in parallel for an index i, wherein i=0 to k−1, the following steps of: partitioning each $$\frac{N}{2^{2i}} \times \frac{N}{2^{2i}}$$

mesh on a diagonal axis into four $$\frac{N}{2^{2i+1}} \times \frac{N}{2^{2i+1}}$$

submeshes; partitioning further each $$\frac{N}{2^{2i+1}} \times \frac{N}{2^{2i+1}}$$

submesh, wherein $$\frac{N}{2^{2i+1}} > 1,$$

on a diagonal axis into four $$\frac{N}{2^{2i+2}} \times \frac{N}{2^{2i+2}}$$

submeshs; and concurrently performing a transportation of all datablocks on all processors included on all submeshes off the diagonal axis.

To facilitate the implementation of the iterative form of the present matrix transpose on meshes a pseudocode version is provided herein. It should be understood that the following can be implemented in a variety of different computer languages on differing systems. Therefore, the following is not meant to be limiting but rather to be representative of the present method described and claimed herein.

Let rid and cid be the row index and column index respectively of a given node on an N×N mesh, that is 0≦rid, cid<N.

```
(2)  k : = ⌈ log₄N ⌉;
(3)  trid : = rid;
(4)  tcid : = cid;
(5)  M : = N;
(6)  diagonal : = TRUE;
(7)  dest : = cid‖rid
(8)  for i : = 0 to k − 1 do
(9)    if (off_diagonal(trid,tcid,M)) then
(10)     diagonal : = FALSE;
(11)   else
(12)     M : = M/2;
(13)     trid : = MOD(trid,M);
(14)     tcid : = MOD(tcid,M);
(15)     if (off_diagonal(trid,tcid,M)) then
(16)       diagonal : = FALSE;
(17)     else
(18)       M : = M/2;
(19)       trid : = MOD(trid,M);
```

-continued
```
(20)       tcid : = MOD(tcid,M);
(21)     endif
(22)   endif
(23)   if (NOT diagonal) then
(24)     send(buf,m,dest);
(25)     recv(buf,m,dest);
(26)     return; /* Finish the Transpose Now */
(27)   else
(28)     timeout(); /* Idle for this Iteration */
(29)   endif
(30) endfor
(31) return (32) BOOLEAN FUNCTION off_diagonal(rid,cid,N)
(33)   if (N == 1) then
(34)     off_diagonal : = FALSE;
(35)     return(off_diagonal);
(36)   endif
(37)   M : = N/2;
(38)   if ((rid ≧ M and cid < M) OR (rid < M and cid ≧ M)) then
(39)     off_diagonal : = TRUE;
(40)   else
(41)     off_diagonal : = FALSE;
(42)   endif
(43)   return;
```

The subroutine Transpose_Iterative( ) takes the arguments N, rid, and cid, where N×N is the size of the mesh, rid is the row index, and cid is the column index, LINE 1. A local variable k is assigned the value of the ceiling of the $\log_4 N$, LINE 2. This establishes the number of iterations needed in the algorithm. In LINES 3–5, a local temporary variable trid is assigned the value of the argument rid; similarly, another local temporary variable tcid is assigned the value of the argument cid; and the argument N is assigned to a temporary mesh size M. A temporary Boolean variable diagonal is assigned the value of TRUE, in LINE 6.

After the initial assignments have been made, a destination is determined in LINE 7 by concatenating the value of cid with the value of rid and storing that destination into the variable dest. Then for each of k iterations a call to the Boolean Function off_diagonal( ) is made to which the values of trid, tcid, and M are passed. If the value of the procedure call returned is TRUE then the temporary variable diagonal is set to the value of FALSE, in LINE 10, because the calling mesh processor is in an off-diagonal submesh after the first-level decomposition, and therefore not on the diagonal. Otherwise, the size of the current submesh size is further reduced from M×M to M/2×M/2 for the second-level decomposition. The value of M is changed to the value of M/2 and the values of trid and tcid are changed by the modulo, in LINES 12–14, to the new row and column indices with respect to the M/2×M/2 submesh. The new values of trid, tcid, and M are passed into the Boolean Function off_diagonal( ) to determine if the calling mesh processor is in an off-diagonal submesh after the second-level decomposition, LINE 15. If the calling mesh processor is not on the diagonal then the temporary variable diagonal gets set to the value of FALSE, in LINE 16. Otherwise, the value of M is further reduced to the value of M/2 and the values of trid and tcid are changed by the modulo, in LINES 18–20, to be ready for the next iteration. In LINE 31, the subroutine returns control to the calling routine having iteratively performed the transpose.

After executing codes from LINE 9 to LINE 22, those mesh processors having the variable diagonal set to the Boolean value FALSE are the ones in a submesh off the diagonal. These off-diagonal processors will perform a transpose operation, by sending a message buf of size m to its corresponding processor dest and receiving a message buf of size m from the same processor, LINES 24–25. Then these off-diagonal processors are done with their transpose operation as far as themselves are concerned, LINE 26. For on-diagonal processors, they will timeout and be idle for this iteration, LINE 28, and keep iterating the loop until they become off-diagonal processors or the looping completes.

The procedure off_diagonal( ) in LINE 32 determines whether the calling mesh processor (rid,cid) in the N×N mesh is in the two on-diagonal submeshes, such as the submeshes 0 and 3 of FIG. 4A, or in the two off-diagonal submeshes, such as the submeshes 1 and 2 of FIG. 4A. An on-diagonal submesh is either the upper-left submesh or the lower-right submesh. An off-diagonal submesh is either the lower-left submesh or the upper-right submesh. In LINE 33, if the size of the mesh is equal to 1, in other words, the mesh cannot be reduced any further, then the processor is a (1×1) submesh included in the diagonal so the Boolean Function returns the value of off_diagonal as FALSE, in LINE 35. Otherwise, the matrix of size M gets set to the value of N/2, in LINE 37. If the row index rid is greater than or equal to size M and the column index cid is less than size M then the value of off_diagonal is TRUE, or, if the row index rid is less than size M and the column index cid is greater than or equal to size M then the off_diagonal is TRUE, in LINES 38–39. Otherwise, the value of off_diagonal is equal to FALSE because this calling processor is located on the diagonal since it is not an off-diagonal one, LINE 41. The procedure returns the value of the Boolean variable off_diagonal by the return statement in LINE 43.

The invention disclosed herein for matrix transpose on a 2-dimensional N×N mesh multi-processor parallel network with circuit-switched-like routing provides a two-level decomposition technique of a matrix. The transposition of all off-diagonal submatrices can be performed concurrently, and wherein the transposition of all successive on-diagonal submatrices can be performed iteratively or recursively. The method is commercially feasible to implement on mesh connected multi-processor architectures for large scale numerical computation applications involving the matrix transpose operation and it takes advantage of meshes with circuit-switched-like routing.

The invention may be embodied in other specific forms without departing from its spirit or essential characteristics. The above-described embodiments of the present invention are to be considered in all respects only as illustrative and not restrictive in scope. The scope of the invention is, therefore, indicated by the appended claims rather than by the foregoing description. Therefore, all changes which come within the meaning and range of equivalency of the claims are to be considered embraced within their scope.

What is claimed and desired to be secured by United States Letters Patent is:

1. A method for transposing a matrix comprising the steps of:
    a) performing a block allocation of elements of the matrix to respective nodes of a multi-node computer system having a 2-dimensional N×N mesh of interconnected nodes, N being an integer greater than 1, each datablock representing a respective submatrix of the matrix, said matrix having a diagonal axis such that a subset of the nodes is on the diagonal axis;
    b) partitioning the mesh into four submeshes, each of size less than or equal to ($\lceil N/2 \rceil \times \lceil N/2 \rceil$), such that a first group of the four submeshes is on the diagonal axis of the matrix, and a second group of the four submeshes is off the diagonal axis;
    c) further partitioning each submesh of the first group, each submesh being of size N'×N', where N' is an integer greater than 1, into four submeshes of size less than or equal to ($\lceil N'/2 \rceil \times \lceil N'/2 \rceil$), such that a third group of the submeshes of size $\lceil N'/2 \rceil \times \lceil N'/2 \rceil$ is on the diagonal axis of the matrix, and a fourth group of the submeshes of size $\lceil N'/2 \rceil \times \lceil N'/2 \rceil$ is off the diagonal axis of the matrix;
    d) concurrently performing a transposition of all datablocks on all of the nodes included on all submeshes of the second and fourth groups; and
    e) repeating steps b–e for each of the submeshes in the third group if there exists a submesh of size greater than (1×1) on the diagonal axis and the submesh has no partitioned submeshes.

2. A method for transposing a matrix having a diagonal axis on a multi-node computer system having a 2-dimensional N×N mesh of interconnected nodes, N being an integral power of 2, the method comprising the steps of:
    a) performing a block allocation of elements of the matrix to respective nodes, each datablock representing a respective submatrix of said matrix;
    b) determining $k = \lceil \log_4 N \rceil$; and
    c) executing in parallel for an index i, wherein i=0 to k−1, the following steps of:
        1) partitioning each $$\frac{N}{2^{2i}} \times \frac{N}{2^{2i}}$$

mesh on a diagonal axis into four $$\frac{N}{2^{2i+1}} \times \frac{N}{2^{2i+1}}$$

submeshes, such that a first group of the four submeshes is on the diagonal axis of the matrix, and a second group of the four submeshes is off the diagonal axis;
        2) partitioning further each submesh of the first group, each submesh being of size $$\frac{N}{2^{2i+1}} \times \frac{N}{2^{2i+1}}$$

$$\frac{N}{2^{2i+1}}$$

being grater than 1, into four submeshes of size $$\frac{N}{2^{2i+2}} \times \frac{N}{2^{2i+2}}$$

such that a third group of the submeshes of size $$\frac{N}{2^{2i+2}} \times \frac{N}{2^{2i+2}}$$

is on the diagonal axis of the matrix, and a fourth group of the submeshes of size $$\frac{N}{2^{2i+2}} \times \frac{N}{2^{2i+2}}$$

is off the axis of the matrix; and
        3) concurrently performing a transposition of all datablocks on all of the nodes included on all submeshes of the second and fourth groups.

3. A computer program product for use in a multi-node computer system having a 2-dimensional N×N mesh of interconnected nodes, N being an integer greater than 1, the computer program product comprising:

a) a recording medium;

b) means, recorded on said medium, for instructing the computer system to 1) perform a block allocation of elements of a matrix to be transposed to respective nodes of the computer system, each datablock representing a respective submatrix of the matrix, said matrix having a diagonal axis such that a subset of the nodes of the system is on the diagonal axis;

2) partition the mesh into four submeshes, each of size less than or equal to $(\lceil N/2 \rceil \times \lceil N/2 \rceil)$, such that a first group of the four submeshes is on the diagonal axis of the matrix, and a second group of the four submeshes is off the diagonal axis;

3) further partition each submesh of the first group, each submesh being of size N'×N', where N' is an integer greater than 1, into four submeshes of size less than or equal to $(\lceil N'/2 \rceil \times \lceil N'/2 \rceil)$, such that a third group of the submeshes of size $\lceil N'/2 \rceil \times \lceil N'/2 \rceil$ is on the diagonal axis of the matrix, and a fourth group of the submeshes of size $\lceil N'/2 \rceil \times \lceil N'/2 \rceil$ is off the diagonal axis of the matrix;

4) concurrently perform a transposition of all datablocks on all of the nodes included on all submeshes of the second and fourth groups; and 5) repeat the instruction steps 2–5 for each of the submeshes in the third group if there exists a submesh of size greater than (1×1) on the diagonal axis and the submesh has no partitioned submeshes.

4. A computer program product for use in a multi-node computer system having a 2-dimensional N×N mesh of interconnected nodes, N being an integral power of 2, the computer program product comprising:

a) a recording medium;

b) means, recorded on said medium, for instructing the computer system to 1) perform a block allocation of elements of a matrix to be transposed to respective nodes of the computer system, each datablock representing a respective submatrix of said matrix;

2) determine $k = \lceil \log_4 N \rceil$; and 3) execute in parallel for an index i, wherein i=0 to k−1, the steps of:

i) partitioning each $$\frac{N}{2^{2i}} \times \frac{N}{2^{2i}}$$

mesh on a diagonal axis into four $$\frac{N}{2^{2i+1}} \times \frac{N}{2^{2i+1}}$$

submeshes, such that a first group of the four submeshes is on the diagonal axis of the matrix, and a second group of the four submeshes off the diagonal axis;

ji) further partitioning each submesh of the first group, each submesh being of size $$\frac{N}{2^{2i+1}} \times \frac{N}{2^{2i+1}}$$

$$\frac{N}{2^{2i+1}}$$

being greater than 1, into four submeshes of size $$\frac{N}{2^{2i+2}} \times \frac{N}{2^{2i+2}}$$

such that a third group of the submeshes of size $$\frac{N}{2^{2i+2}} \times \frac{N}{2^{2i+2}}$$

is on the diagonal axis of the matrix, and a fourth group of the submeshes of size $$\frac{N}{2^{2i+2}} \times \frac{N}{2^{2i+2}}$$

is off the diagonal axis of the matrix; and jii) concurrently performing a transposition of all datablocks on all of the nodes included on all submeshes of the second and fourth groups.

5. A multi-node computer system having a 2-dimensional N×N mesh of interconnected nodes, N being an integer greater than 1, the system comprising:

a) means for performing a block allocation of elements of a matrix to be transposed to the nodes, each datablock representing a respective submatrix of the matrix, said matrix having a diagonal axis such that a subset of the nodes is on the diagonal axis;

b) means for partitioning the mesh into four submeshes, each of size less than or equal to $(\lceil N/2 \rceil \times \lceil N/2 \rceil)$, such that a first group of the four submeshes is on the diagonal axis of the matrix, and a second group of the four submeshes is off the diagonal axis;

c) means for further partitioning each submesh of the first group, each submesh being of size N'×N', where N' is an integer greater than 1, into four submeshes of size less than or equal to $\lceil N'/2 \rceil \times \lceil N'/2 \rceil$, such that third group of the submeshes of size $\lceil N'/2 \rceil \times \lceil N'/2 \rceil$ is on the diagonal axis of the matrix, and a fourth group of the submeshes of size $\lceil N'/2 \rceil \times \lceil N'/2 \rceil$ is off the diagonal axis of the matrix;

d) means for concurrently performing a transposition of all datablocks on all of the nodes included on all submeshes of the second and fourth groups; and e) means for repeating steps b–e for each of the submeshes in the third group if there exists a submesh of size greater than (1×1) on the diagonal axis and the submesh has no partitioned submeshes.

6. A multi-node computer system having a 2-dimensional N×N mesh of interconnected nodes, N being an integral power of 2, the system comprising:

a) means for performing a block allocation of elements of a matrix to be transposed to the nodes, each datablock representing a respective submatrix of said matrix;

b) means for determining $k = \lceil \log_4 N \rceil$; and c) means for executing in parallel for an index i, wherein i=0 to k−1, the following steps of:

1) partitioning each $$\frac{N}{2^{2i}} \times \frac{N}{2^{2i}}$$

mesh on a diagonal axis into four $$\frac{N}{2^{2i+1}} \times \frac{N}{2^{2i+1}}$$

submeshes, such that a first group of the four submeshes is on the diagonal axis of the matrix, and a second group of the four submeshes is off the diagonal axis;

2) partitioning further each submesh of the first group, each submesh being of size $$\frac{N}{2^{2i+1}} \times \frac{N}{2^{2i+1}}, \frac{N}{2^{2i+1}}$$

being greater than 1 into four submesh being of size $$\frac{N}{2^{2i+2}} \times \frac{N}{2^{2i+2}},$$

such that a third group of the submeshes of size $$\frac{N}{2^{2i+2}} \times \frac{N}{2^{2i+2}}$$

is on the diagonal axis of the matrix, and a fourth group of the submeshes of size $$\frac{N}{2^{2i+2}} \times \frac{N}{2^{2i+2}}$$

is off the diagonal axis of the matrix; and 3) concurrently performing a transposition of all datablocks on all of the nodes included on all submeshes of the second and fourth groups.

7. A processor node, for use in a multi-node computer system having a 2-dimensional N×N mesh of interconnected nodes, the computer system having a second node which corresponds with said node, said node comprising:

a) means, responsive to a command from the computer system, for receiving an allocation of a datablock, said datablock representing elements of a submatrix of a matrix to be transposed by the computer system, said matrix having a diagonal axis allocated to a subset of the nodes;

b) means, operable responsive to:

(i) partitioning of the mesh into four submeshes, each of size less than or equal to $(\lceil N/2 \rceil \times \lceil N/2 \rceil)$, such that a first group of the four submeshes is on the diagonal axis of the matrix and a second group of the four submeshes is off the diagonal axis, and (ii) further partitioning of each submesh of the first group, each submesh being of size N'×N', where N' is an integer greater than 1, into four submeshes of size less than or equal to $\lceil N'/2 \rceil \times \lceil N'/2 \rceil$, such that a third group of the submeshes of size $\lceil N'/2 \rceil \times \lceil N'/2 \rceil$ is on the diagonal axis of the matrix and a fourth group of the submeshes of size $\lceil N'/2 \rceil \times \lceil N'/2 \rceil$ is off the diagonal axis of the matrix, for transposing the datablock allocated to said node with a datablock allocated to the second node, the transposing means being operable concurrently with a transposition of all datablocks on all of the nodes included on all submeshes of the second and fourth groups; and c) means for repeating the operation of the means for transposing if there exists a submesh of size greater than (1×1) on the diagonal axis and the submesh has no partitioned submeshes.

8. A processor node, for use in a multi-node computer system having a 2-dimensional N×N mesh of interconnected nodes, N being an integral power of 2, the computer system having a second node which corresponds with said node, the processor node comprising:

means, responsive to a command from the computer system, for receiving a block allocation of elements of a matrix to be transposed to respective nodes of the computer system, each datablock representing a respective submatrix of said matrix;

means, operable responsive to:

1) partitioning each $$\frac{N}{2^{2i}} \times \frac{N}{2^{2i}}$$

mesh into four submeshes, each of size $$\frac{N}{2^{2i+1}} \times \frac{N}{2^{2i+1}},$$

where $k = \lceil \log_4 N \rceil$ and i is an index having value from 0 size to k−1, such that a first group of the four submeshes is on the diagonal axis of the matrix and a second group of the four submeshes is off the diagonal axis, and 2) further partitioning each submesh of the first group, each submesh being of size $$\frac{N}{2^{2i+1}} \times \frac{N}{2^{2i+1}}, \frac{N}{2^{2i+1}}$$

being greater than 1, into four submeshes of size $$\frac{N}{2^{2i+2}} \times \frac{N}{2^{2i+2}},$$

such that a third group of the submeshes of size $$\frac{N}{2^{2i+2}} \times \frac{N}{2^{2i+2}}$$

is on the diagonal axis of the matrix, and a fourth group of the submeshes of size $$\frac{N}{2^{2i+2}} \times \frac{N}{2^{2i+2}}$$

is off the diagonal axis of the matrix, for transposing the datablock allocated to said node with a datablock allocated to the second node, the transposing means being operable concurrently with a transposition of all datablocks on all of the nodes included on all submeshes of the second and fourth groups.

* * * * *